(12) United States Patent
Lair

(10) Patent No.: US 6,945,031 B2
(45) Date of Patent: Sep. 20, 2005

(54) RECESSED ENGINE NACELLE

(75) Inventor: Jean-Pierre Lair, San Antonio, TX (US)

(73) Assignee: The Nordam Group, Inc., Tulsa, OK (US)

( * ) Notice: Subject to any disclaimer, the term of this patent is extended or adjusted under 35 U.S.C. 154(b) by 22 days.

(21) Appl. No.: 10/781,408

(22) Filed: Feb. 18, 2004

(65) Prior Publication Data

US 2004/0164204 A1 Aug. 26, 2004

Related U.S. Application Data

(60) Provisional application No. 60/449,081, filed on Feb. 21, 2003.

(51) Int. Cl.$^7$ ............................. F02K 3/02; B64D 33/04; B64D 29/00
(52) U.S. Cl. ................... 60/226.1; 60/262; 239/265.11; 244/53 B
(58) Field of Search ............................. 60/226.1–226.3, 60/262, 770, 771; 244/53 B; 239/265.11

(56) References Cited

U.S. PATENT DOCUMENTS

| 3,779,010 | A |   | 12/1973 | Chamay et al. |
| 3,820,719 | A |   | 6/1974 | Clark |
| 4,291,782 | A |   | 9/1981 | Klees |
| 4,922,713 | A |   | 5/1990 | Barbarin et al. |
| 5,181,676 | A |   | 1/1993 | Lair |
| 5,269,135 | A | * | 12/1993 | Vermejan et al. ........... 60/226.1 |
| 5,694,767 | A |   | 12/1997 | Vdoviak et al. |
| 5,778,659 | A |   | 7/1998 | Duesier et al. |
| 5,806,302 | A | * | 9/1998 | Cariola et al. ................ 60/204 |
| 5,819,527 | A |   | 10/1998 | Fournier |
| 5,826,823 | A |   | 10/1998 | Lymons et al. |
| 5,853,148 | A |   | 12/1998 | Standish et al. |
| 5,863,014 | A |   | 1/1999 | Standish |
| 5,875,995 | A |   | 3/1999 | Moe et al. |
| 5,934,613 | A |   | 8/1999 | Standish et al. |
| 6,070,407 | A |   | 6/2000 | Newton |
| 6,751,944 | B2 | * | 6/2004 | Lair ............................ 60/226.3 |
| 2003/0126856 | A1 |  | 7/2003 | Lair |

* cited by examiner

*Primary Examiner*—Charles G. Freay
(74) *Attorney, Agent, or Firm*—Francis L. Conte

(57) ABSTRACT

A gas turbine engine nacelle includes an inner skin surrounded by a radially outer skin. The inner skin terminates at an exhaust outlet. The outer skin terminates at a recess in the inner skin extending into a closed cavity under the outer skin.

20 Claims, 3 Drawing Sheets

RECESSED ENGINE NACELLE

This application claims the benefit of U.S. Provisional Application No. 60/449,081; filed Feb. 21, 2003.

BACKGROUND OF THE INVENTION

The present invention relates generally to turbofan aircraft engines, and, more specifically, to nacelles therefor.

A typical turbofan aircraft engine includes a fan powered by a core engine. The core engine includes a surrounding cowl or nacelle, and the fan includes a corresponding cowl or nacelle at the forward end of the core engine which extends aft either in part or fully thereover.

The fan nacelle is spaced radially outwardly from the core nacelle to define an annular bypass duct therebetween. During operation, the core engine powers the fan which pressurizes ambient air to produce propulsion thrust in the fan air bypassing the core engine and discharged from the fan exhaust nozzle.

A portion of the fan air is channeled into the core engine wherein it is pressurized and mixed with fuel for generating hot combustion gases. Energy is extracted from the combustion gases in high and low pressure turbines which in turn power a compressor and the fan. The core exhaust gases are discharged from the core engine through a core exhaust nozzle and provide additional thrust for propelling the aircraft in flight.

In a typical short fan nacelle, the fan nozzle is spaced upstream from the core nozzle, and the fan exhaust is discharged separately from and surrounding the core exhaust. In a long nacelle, the fan nacelle extends aft of the core nozzle to provide a single common nozzle through which both the fan bypass air and core exhaust are discharged from the engine.

The fan nozzle and the core nozzle are typically fixed area nozzles, although they could be configured as variable area nozzles. Variable area nozzles permit adjustment of the aerodynamic performance of the engine which correspondingly increases complexity, weight, and cost of the engine.

Furthermore, turbofan aircraft engines typically include thrust reversers for use in providing braking thrust during landing of the aircraft. Various types of thrust reversers are found in the engine nacelle and further increase complexity, weight, and cost of the engine.

In U.S. Pat. No. 6,751,944; and entitled "Confluent Variable Exhaust Nozzle," assigned to the present assignee, an improved variable area exhaust nozzle is disclosed for a turbofan aircraft engine. The confluent nozzle includes outer and inner conduits, with a plurality of flaps therebetween. The flaps may be selectively opened to bypass a portion of exhaust flow from the inner conduit through the outer conduit in confluent exhaust streams from concentric main and auxiliary exhaust outlets.

In this way, the auxiliary outlet may be operated during takeoff operation of the aircraft for temporarily increasing exhaust flow area for correspondingly reducing velocity of the exhaust flow. Noise may therefore be reduced during takeoff operation using a relatively simple and compact variable area configuration.

However, the interruption in continuity of the fan nacelle caused by the auxiliary outlet may introduce base drag thereat during aircraft flight, in particular, during the typically long duration cruise operation.

Accordingly, it is desired to provide an improved nacelle for reducing boundary layer thickness and drag during operation.

BRIEF SUMMARY OF THE INVENTION

A gas turbine engine nacelle includes an inner skin surrounded by a radially outer skin. The inner skin terminates at an exhaust outlet. The outer skin terminates at a recess in the inner skin extending into a closed cavity under the outer skin.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
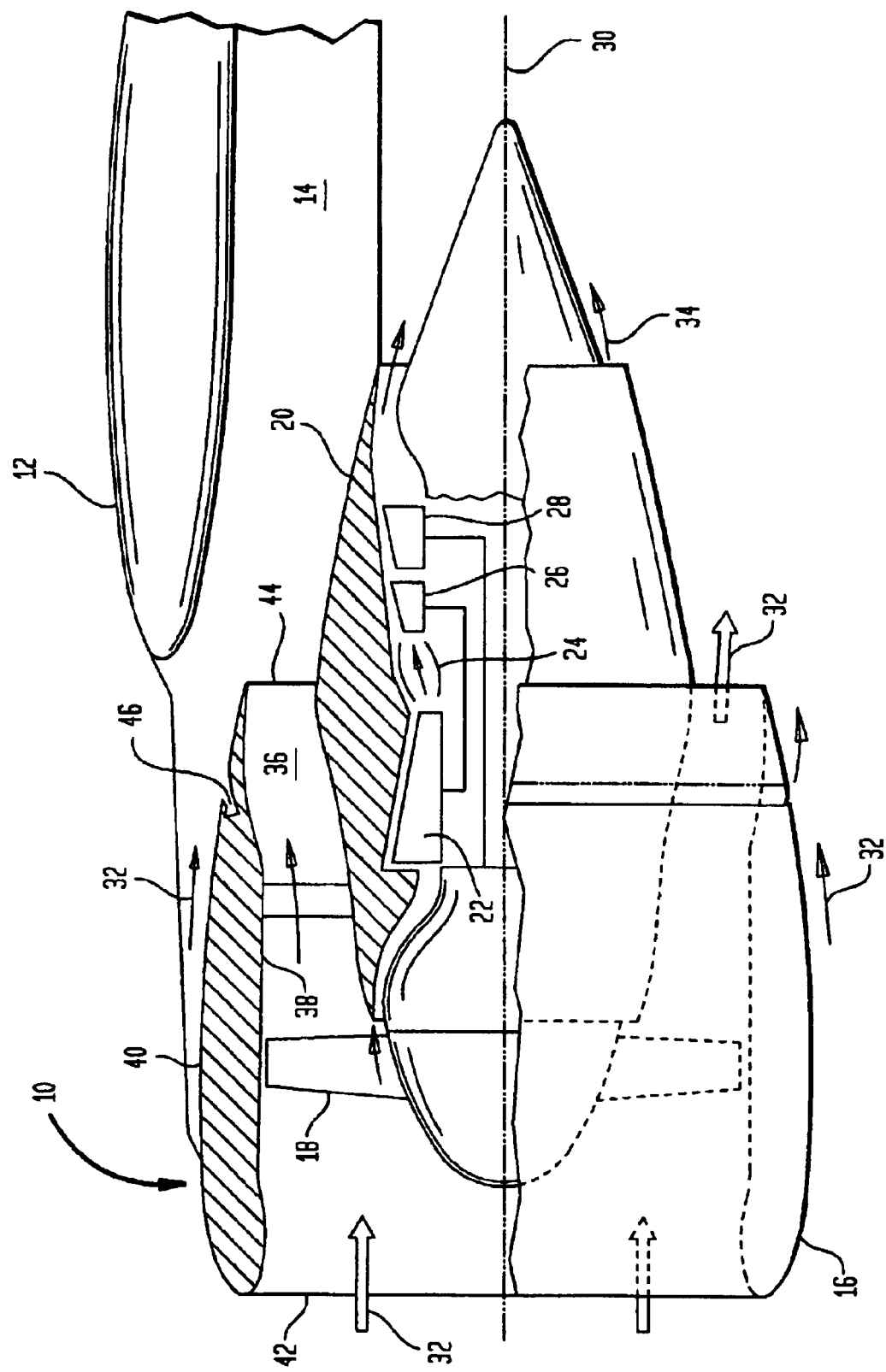
FIG. 1 is a partly sectional, axial view of a turbofan gas turbine engine mounted to the wing of an aircraft.

Illustrated in FIG. 1 is a turbofan aircraft gas turbine engine 10 suitably mounted to the wing 12 of an aircraft by a supporting pylon 14. Alternatively, the engine could be mounted to the fuselage of the aircraft if desired.

The engine includes an annular fan nacelle 16 surrounding a fan 18 which is powered by a core engine surrounded by a core nacelle or cowl 20. The core engine includes in serial flow communication a multistage axial compressor 22, an annular combustor 24, a high pressure turbine 26, and a low pressure turbine 28 which are axisymmetrical about a longitudinal or axial centerline axis 30.

During operation, ambient air 32 enters the fan nacelle and flows past the fan blades into the compressor 22 for pressurization. The compressed air is mixed with fuel in the combustor 24 for generating hot combustion gases 34 which are discharged through the high and low pressure turbines 26, 28 in turn. The turbines extract energy from the combustion gases an power the compressor 22 and fan 18, respectively.

The fan nacelle 16 illustrated in FIG. 1 is relatively short and surrounds the forward portion of the core engine to define an annular fan bypass duct 36 through which a major portion of the pressurized fan air 32 bypasses the core engine to provide propulsion thrust.

The fan nacelle includes an inner skin 38 surrounded by a radially outer skin 40. The two skins may be formed of suitable sheet metal mounted to supporting ribs or frames for providing the required aerodynamic contour of the outer and inner surfaces of the fan nacelle.

The inner skin 38 defines an annular inlet 42 at its upstream or leading edge through which the ambient air 32 is first received for flow past the fan 18. The inner skin 38 terminates at an aft end or trailing edge defining an exhaust outlet 44 of a fixed area fan exhaust nozzle.

During operation, the core engine powers the fan 18 which pressurizes the ambient air 32, a majority of which is channeled through the bypass duct 36 and out the fan nozzle for providing a majority of the propulsion thrust for powering the aircraft in flight. The radially inner portion of the inlet air is channeled through the core engine for being burned with fuel to produce power to drive the fan, with the spent combustion gases 34 being discharged from a separate core nozzle at the aft end of the core engine in a conventional manner.

The fan nacelle 16 has an aerodynamically smooth profile for maximizing performance of the air channeled therethrough, as well as the ambient air flowing thereover during aircraft flight. As the engine propels the aircraft during flight, aerodynamic drag is developed due to friction between the ambient freestream air and both the fan nacelle and the exposed portion of the core cowl or core nacelle surrounding the core engine.

Figure 2:
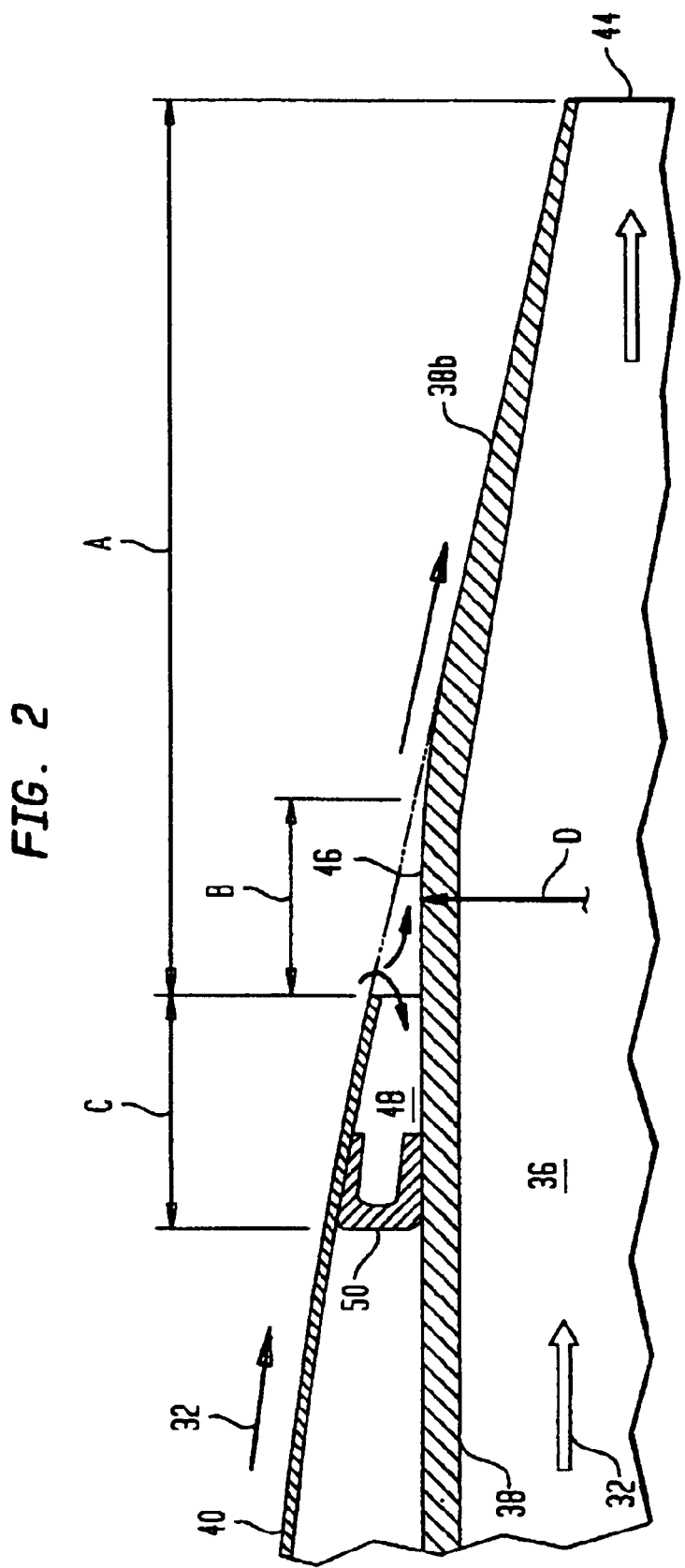
FIG. 2 is an enlarged axial sectional view through the aft portion of the fan nacelle illustrated in FIG. 1.

In order to minimize nacelle drag, the outer skin 40 of the fan nacelle as illustrated in FIG. 2 terminates at an aft end or trailing edge thereof at a recess 46 in the inner skin 38 to provide a local interruption in the axial continuity of the outer surface of the fan nacelle at its aft end. The recess 46 extends forwardly into an otherwise closed or blind cavity 48 undercut inside the trailing edge of the outer skin.

The inner and outer skins 38,40 illustrated in FIG. 2 converge aft in the typical fashion of a fan nacelle, but are axially interrupted by the new introduction of the recess 46 therebetween. The inner skin 38 extends downstream past the terminated outer skin 40 in a converging boattail portion 38b thereof having the nozzle outlet 44 at its aft end. The aft portion of the outer skin 40 is disposed forward of the boattail portion 38b and is locally separated therefrom by the recess 46.

The recess 46 extends upstream into the cavity 48 which is defined in part by a radial frame 50 extending circumferentially around the nacelle which bridges together the inner and outer skins 38,40 forward of the recess. The frame and inner and outer skins surrounding the cavity are preferably imperforate for closing the cavity except at the inlet thereof defined at the trailing edge of the outer skin adjoining the recess 46.

Since the outer skin 40 converges over the aft portion thereof, the cavity 48 located therebelow also converges aft to the recess 46.

The recess 46 provides a local interruption in the continuity of the external surface of the nacelle, and smoothly blends into the boattail portion of the inner skin 38b aft of the recess. Correspondingly, the inner and outer skins 38,40 are axially coextensive or flush with each other as they converge or cross the recess 46 in a common and continuous convergence.

As illustrated in FIG. 2, the trailing edge of the outer skin 40 is spaced upstream from the trailing edge of the inner skin 38 by the axial distance A. The recess 46 has an axial length B which is a portion of the total offset length A. The cavity 48 extends upstream from the recess for an axial distance C. And, the inner skin 38 is preferably generally cylindrical under the recess 46 with a nominal outside diameter D.

These various dimensions A–D in conjunction with the specific size and configuration of the recess 46 may be varied for reducing the aerodynamic drag over the nacelle during the aircraft flight. The drag may be reduced by reducing the thickness of the boundary layer of the ambient freestream air 32 as it travels over the aft end of the fan nacelle prior to joining the fan exhaust from the outlet 44.

Flow analysis of this configuration indicates that the recess will change the static pressure distribution or field in the streamwise or axial direction downstream from the trailing edge of the outer skin over a substantial portion of the boattail region of the inner skin. Preferably, the static pressure field is higher in the region of the recess than it otherwise would be without the recess, and the higher static pressure decreases the thickness of the boundary layer.

Furthermore, the pressurized fan air discharged from the nozzle outlet 44 is effective for increasing the surface pressure over the aft portion of the boattail region for reducing the thickness of the boundary layer. The increased static pressure over the recess and boattail region of the exposed inner skin reduces the thickness of the boundary layer of freestream air thereover and thereby decreases aerodynamic drag for improved performance of the aircraft engine.

The recess 46 illustrated in FIG. 2 is a locally small interruption in the continuity of the nacelle outer surface. The recess 46 preferably extends around the circumference of the nacelle, and is interrupted solely by the supporting pylon at the top of the engine, and a corresponding longitudinal frame at the bottom of the engine in the typical C-duct configuration of the nacelle.

The recess 46 extends in axial length B over a substantially minor portion of the total offset distance A to the exhaust outlet 44. And in one configuration analyzed, the axial length of the cylindrical portion of the recess 46 is about twelve percent (12%) of the total offset distance A between the aft ends of the inner and outer skins 38,40.

Analysis indicates a small reduction in static pressure at the forward end of the recess 46 followed by a substantial increase in static pressure over a majority of the recess, followed by a region of no significant change in static pressure distribution, and further followed by an increased static pressure over the remaining 15% of the boattail portion of the exposed outer skin, as compared to a conventional nacelle without the recess 46 therein. The overall effect of the increased static pressure distribution over the recess and boattail region is a significant reduction in boundary layer thickness, and corresponding reduction in aerodynamic drag.

The maximum depth of the recess 46 is preferably controlled by the area of the arcuate inlet to the blind cavity 48. The inlet end of the cavity 48 extends circumferentially around the circumference of the fan nacelle and has a collective flow area which is preferably a substantially minor portion of the discharge flow area for the exhaust outlet 44.

For example, the collective flow area for the inlet of the cavity 48 may be less than or equal to about ten percent (10%) of the total flow area of the exhaust outlet 44. Preferably, the inlet area of the cavity may be within the range of about 5–10 percent of the total flow area of the outlet 44. Since the area of the cavity inlet is based on the circumferential length thereof and radial height, the radial height or depth of the recess 46 may be determined from the required flow area of the outlet 44 and the required diameter of the nacelle at the recess 46.

As indicated above, the recess 46 may be introduced into the aft end of the short fan nacelle 16 illustrated in FIG. 1 which surrounds the core engine to define the fan bypass duct 36 radially therebetween which discharges the pressurized fan air through the fan nozzle outlet 44.

In view of the simplicity of the recessed nacelle, it may be introduced in any type of aircraft engine and in the various forms of nacelles found therein for reducing thickness of the boundary layer, and thereby reducing drag therefrom.

Typical engine nacelles converge along their aft portions and permit the freestream boundary layer to increase in size or depth which may lead to flow detachment over the nacelle aft end. By the simple introduction of the local recess in the converging portion of engine nacelles, drag may be significantly reduced due to the increased static pressure distribution effected by the recess and its cooperating cavity 48.

Figure 3:
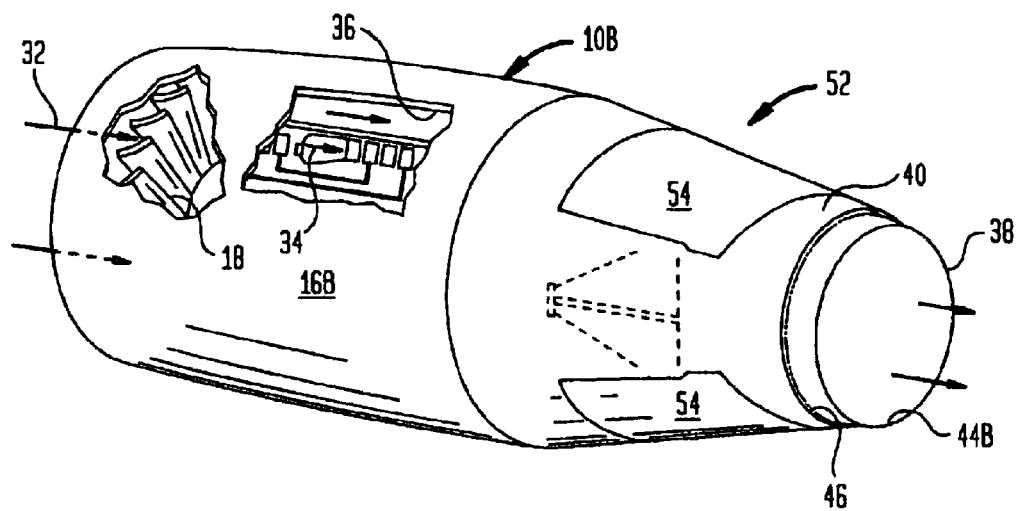
FIG. 3 is a partly sectional, isometric view of a turbofan engine having a long nacelle with a common outlet in accordance with another embodiment.
Figure 4:
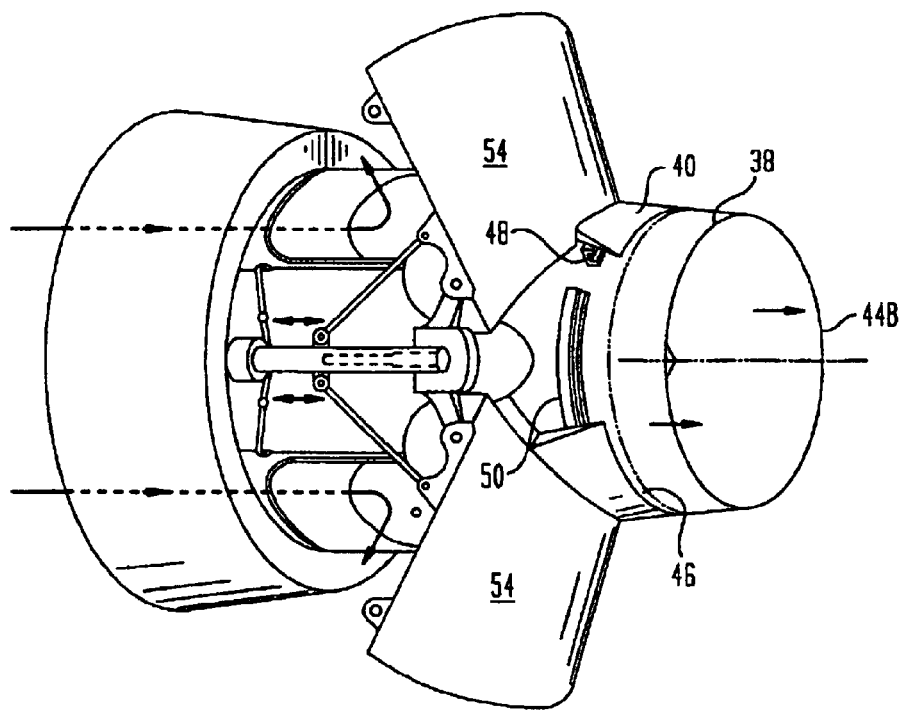
FIG. 4 is an isometric view of the aft end of the engine illustrated in FIG. 3 with thrust reverser doors deployed.

FIGS. 3 and 4 illustrate an exemplary turbofan engine 10B having a long nacelle 16B surrounding the core engine to define a common exhaust outlet 44B at the aft end thereof for both the core exhaust 34 and the fan bypass air 32.

In this embodiment of the engine, a conventional thrust reverser 52 is disposed upstream from the recess 46, and includes a pair of reverser doors 54 which may be deployed open and stowed closed by corresponding actuators and linkages therefor.

The small recess 46 and its cooperating blind cavity 48 may be readily incorporated in the external surface of the nacelle immediately forward of the common exhaust outlet 44B.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

What is claimed is:

1. A gas turbine engine nacelle comprising:
   an inner skin terminating at an exhaust outlet; and
   a radially outer skin surrounding said inner skin, and terminating at a recess in said inner skin extending into a closed cavity under said outer skin.

2. A nacelle according to claim 1 wherein said outer and inner skins converge aft and are axially interrupted by said recess therebetween.

3. A nacelle according to claim 2 wherein said cavity converges aft to said recess.

4. A nacelle according to claim 3 wherein said cavity includes a radial frame bridging said inner and outer skins forward of said recess.

5. A nacelle according to claim 2 wherein said inner skin is generally cylindrical under said recess.

6. A nacelle according to claim 5 wherein said recess blends into said inner skin aft thereof, and said outer and inner skins are axially coextensive across said recess in a common convergence thereacross.

7. A nacelle according to claim 2 wherein said recess extends in axial length over a minor portion of the distance to said exhaust outlet.

8. A nacelle according to claim 7 wherein said recess axial length is about 12 percent of the distance between the aft ends of said inner and outer skins.

9. A nacelle according to claim 2 wherein said cavity has an arcuate inlet at the aft end of said outer skin, with a flow area being a minor portion of the flow area for said exhaust outlet.

10. A nacelle according to claim 9 wherein said flow area for said cavity inlet is less than or equal to about 10 percent of the flow area for said exhaust outlet.

11. A nacelle according to claim 2 comprising a short nacelle surrounding a forward portion of a core engine to define a fan bypass duct therebetween terminating at said exhaust outlet disposed upstream from a separate outlet of said core engine.

12. A nacelle according to claim 2 comprising a long nacelle surrounding a core engine to define a common exhaust outlet at the aft end thereof for both core exhaust and fan bypass exhaust.

13. A gas turbine engine nacelle comprising:
   an inner skin terminating at a converging boattail portion thereof having a nozzle outlet at an aft end thereof; and
   a radially outer skin surrounding said inner skin forward of said boattail portion, and converging to a recess in said inner skin disposed upstream from said nozzle outlet, with said recess extending forward into a closed cavity under said outer skin.

14. A nacelle according to claim 13 wherein said cavity includes a radial frame bridging said inner and outer skins forward of said recess.

15. A nacelle according to claim 14 wherein said inner skin is generally cylindrical under said recess.

16. A nacelle according to claim 15 wherein said recess blends into said boattail portion aft thereof, and said outer and inner skins are axially coextensive across said recess in a common convergence thereacross.

17. A nacelle according to claim 16 wherein said recess extends in axial length over a minor portion of the distance to said exhaust outlet.

18. A nacelle according to claim 17 wherein said cavity has an arcuate inlet at the aft end of said outer skin, with a flow area being a minor portion of the flow area for said exhaust outlet.

19. A nacelle according to claim 18 wherein said recess axial length is about 12 percent of the distance between the aft ends of said inner and outer skins.

20. A nacelle according to claim 19 wherein said flow area for said cavity inlet is less than or equal to about 10 percent of the flow area for said exhaust outlet.

* * * * *